United States Patent [19]

Karasaki

[11] Patent Number: 4,978,988
[45] Date of Patent: Dec. 18, 1990

[54] FOCUS DETECTION APPARATUS OF CAMERA

[75] Inventor: Toshihiko Karasaki, Sakai, Japan

[73] Assignee: Minolta Camera Kabushiki Kaisha

[21] Appl. No.: 121,300

[22] Filed: Nov. 16, 1987

[30] Foreign Application Priority Data

Nov. 20, 1986 [JP] Japan .................................. 61-278381

[51] Int. Cl.$^5$ ............................................ G03B 13/36
[52] U.S. Cl. ................................. 354/406; 250/201.8
[58] Field of Search ............... 354/402, 406, 407, 408; 250/201 R, 201 PF, 204, 201.8

[56] References Cited

U.S. PATENT DOCUMENTS

| | | | |
|---|---|---|---|
| 4,185,191 | 1/1980 | Stauffer | 354/407 X |
| 4,246,476 | 1/1981 | Stauffer | 354/407 X |
| 4,346,970 | 8/1982 | Kawabata et al. | 354/407 |
| 4,387,975 | 6/1983 | Araki | 354/407 |
| 4,414,470 | 11/1983 | Nakaoka | 354/406 X |
| 4,526,458 | 7/1985 | Kawamura et al. | 354/406 |
| 4,644,148 | 2/1987 | Kusaka et al. | 354/406 X |
| 4,768,052 | 8/1988 | Hamada et al. | 354/402 |
| 4,774,539 | 9/1988 | Suda et al. | 354/406 |
| 4,857,718 | 8/1989 | Karasaki et al. | 250/201 |

FOREIGN PATENT DOCUMENTS 118019  9/1980  Japan .................................. 354/407

*Primary Examiner*—W. B. Perkey

[57] ABSTRACT

In the present apparatus, a field mask is arranged at the predetermined focal plane of a photographic lens of a camera. This mask is formed with central rectangular opening horizontally and a pair of side rectangular openings vertically extending. Light bundles passed through these rectangular openings are subjected to condensation by passing through respective condenser lenses. At a downstream, there is provided a re-imaging plate which is formed with corresponding three pairs of re-imaging lenses. All these re-imaging lenses are made into plano-convex shape having one and the same radius of curvature and molded solid with the substrate board of said re-imaging plate into a solid one piece.

17 Claims, 4 Drawing Sheets

FOCUS DETECTION APPARATUS OF CAMERA

BACKGROUND OF THE INVENTION

1. Field of the Invention

The present invention relates to a focus detection apparatus of a camera, which detects the focusing condition of a photographic lens of the camera with respect to a predetermined focal plane.

2. Description of the Prior Art

FIG. 1 is an outline perspective view of a prior art focus detection apparatus operating with a phase difference detection principle. In FIG. 1, $L_0$ represents a condenser lens and $L_1$ and $L_2$ show a pair of re-imaging lenses arranged substantially symmetrical to the optical axis $l_0$ of a photographic lens, not shown, of the camera. The optical axis $l_0$ may be referred to as "main optical axis" in the following description.

The overall image formed by the photographing or objective lens is reformed through the condenser lens $L_0$ and re-imaging lenses $L_1$; $L_2$ into first and second images. In this case, the distance between these first and second images will be subjected to a variation, depending upon the focusing condition of the photographing lens.

Thus, when first and second rows I and II of light reception elements of a line sensor $P_0$ are arranged at a conjugate position of the predetermined focal plane FP of the photographing lens or at a close position thereof with the condenser lens $L_0$ and the refocusing lenses $L_1$; $L_2$ as shown, the relative position of said first and second images represents the focusing condition of the photographic lens. By sensing the thus caused relative positional variation with the use of the first and second light reception element rows I; II, the focusing condition of the photographing lens can be detected.

In the case of such a focus detecting apparatus having the optical system set forth above, if the center-to-center line of re-imaging lens pair $L_1$; $L_2$ should incline, even the slightest, from the common and extending line of the first and second light reception element rows I, II, the now formed first and second images will be subjected disadvantageously to a shifting widthwise of first and second light reception element rows I; II, whereby a kind of squint cast phenomenon is created. If this phenomenon should occur to take place, the focus detection accuracy would be considerably reduced.

Now assuming that the center-to-center distance between the both re-imaging lenses $L_1$; $L_2$ is measured to 1, and the center O' of lens $L_2$ is positioned at a higher level by a distance $\Delta_y$ than the center O of lens $L_1$ at a plane which includes the main optical axis $l_0$ of the photographing lens and which extends perpendicular to the extending direction of the first and second light reception element rows I; II, or in other words that the line segment O–O' is inclined by an angle $\theta = \tan^{-1}(\Delta_y/l)$ relative to the element rows I; II. It is further assumed that I' and II' represent reversedly projected theoretical images of said element rows I and II on the predetermined focal plane FP through the reimaging lenses $L_1$; $L_2$ and condenser lens $L_0$.

Now referring to FIG. 2, showing a considerably enlarged views from the foregoing, an image shifting by $k \Delta_y$ (k being a certain constant which is a reciprocal of magnification $\beta$ of the re-imaging lens) is clearly seen to have occurred between the both images I'; II'. Reversely, it will be seen that at the predetermined focal plane FP, the regional images I'; II' will be reproduced on the first and second light reception element rows I; II, respectively, and with the image shifting of $k\Delta_y$. In this case, it should thus be noted that a distinct and clear error should occur in the focus detection operation, only with an exception of the case of a vertical line image formed on the predetermined focal plane FP.

As for the counter measure to prevent the squint cast phenomenon in the case of single focus detection area employed, reliance may be had on the proposal shown and described in Japanese Patent Publication (unexamined) No. Sho-60-31109. Another solution is to execute precisely adjustment parallelism between the segmental line O–O' connecting the centers of re-imaging lens pair $L_1$; $L_2$ and the extending direction of line sensor $P_0$ to a high precision degree of plus/minus 5 minutes or so.

However, in the case of a camera, provided with a plurality of focus-detection assemblies each including a condenser lens $L_0$ and a pair of re-imaging lenses $L_1$ and $L_2$, it would be insufficient to rely upon the foregoing mode of adjustment, in order to provide positioning as required for all the included re-imaging lens pairs as well as all the included line sensors, because of the fact that these line sensors or re-imaging lens element pairs must be arranged separately and independently movable. Taking the line sensors as an example, all these line sensors can not be formed on one and the same tip, thereby inviting a considerable costup of the manufacture and a considerable increase of AF sensor module to be employed. Further, it is necessary to execute a plurality of adjustments during the manufacturing step, inviting a substantially reduced productivity.

Further, even if the plurality of re-imaging lens pairs could have been produced into one piece such as a solid molded piece, a certain "squint cast" phenomenon could disadvantageously appear at least in one or other of the focus detection areas on account of a smaller degree of freedom in adjustability, when making necessary positional adjustments of the chip formed with line sensors as well as re-imaging lens pairs, and indeed, by reason of regularity unavoidable errors in the lens machining preciseness can occur.

SUMMARY OF THE INVENTION

An object of the present invention is to provide an improved focus detection apparatus of a camera, having a plurality of focus detection areas, yet capable of preventing the otherwise occurring "squint cast" phenomenon.

A further object is to provide an improved focus detection apparatus of the above kind, providing no necessity of individual adjustments of several line sensors or re-imaging lens pairs included in the apparatus.

For fulfilment of the foregoing objects of the invention, such an improved apparatus for detecting the focusing condition of a photographic lens of a camera is proposed according to this invention which comprises:
 a plurality of focus detector blocks each comprising:
  a condenser lens for condensing light which forms an image by the photographic lens,
  a pair of re-imaging lenses for receiving a part of said image light from said condenser lens for dividingly reforming therefrom a first and a second partial image;
  first and second light reception element groups arranged separately, in line with each other and for receiving said first and second partial images, respectively, whereby mutual and positional differences between the first and second partial images can be sensed as a function of the focus adjusting state at said photographic lens system;

all the re-imaging lenses being formed of plano-convex lenses having one and the same radius of curvature and formed into a molded single member as a whole.

Each pair of the re-imaging lenses is arranged preferably in periphery-to-periphery contacting relationship. However, each pair of said re-imaging lenses can be arranged at a small distance from each other when seen in a periphery-to-periphery relationship.

The present invention is proposed upon careful observation and study of the foregoing facts, and for obviation of "squint cast" phenomenon in any one or more of the focus detection areas, to provide an easy focus determination possibility; a higher production efficiency; an easy miniaturing capability with lower cost, among others.

In the following, the reason why, according to this invention, a plurality of pairs of re-imaging lenses and the corresponding numbers of light reception element rows can be positioned as required to a high precision degree, will be set forth in more detail.

First, as for the mutual positional preciseness of the first and second rows of light reception elements, there may be no difficulty to form and arrange a plurality of pairs of light reception element rows on one and the same substrate board at a high precision level under utilization of currently employed manufacturing technique of semi-conductor integrated circuits.

Therefore, in order to maintain and assure the required positional preciseness of the re-imaging lenses pair to such degree of error of $1-2\mu$ or so relative to the design value) and to reduce the number of parts to be employed, all the pairs of re-imaging lenses are made to have one and the same radius of curvature and can be formed into one molded structure.

As for the machining method of metal molds for the execution of molding to provide the such a single molded structure, electrical discharge machining is relied upon.

In this case, the radius of curvature of the discharge electrodes is fixed to one and the same value, chuck-off operations are dispensed with (which means that no tool exchange or electrode exchange is employed); and electric discharge electrodes are fed to position at a high preciseness. In this way, the mutual positioning of forming recesses on the solid and unified molding molds for the re-imaging lenses can be maintained at an extremely high precision degree. On the contrary, when once chucked off, the positional preciseness of the electrodes must be lowered to a substantial degree, and it is highly disadvantageous to use re-imaging lenses of different radii of curvature. On the other hand, use of bi-concave or concave-convex reimaging lenses are also unrecommendable on account of a large difficulty in providing the required preciseness at both surfaces of the lens and of the likelihood of the occurrence of eccentric lens formation, causing thereby an unapproved size inaccuracy to occur. For these reasons, it is most recommendable to use plano-convex lenses.

These and further objects, features and merits of the invention can be more specifically understood when reading the following detailed description of the related prior art apparatus as well as preferred embodiments of the invention to be set forth with reference to the accompanying drawings.

DETAILED DESCRIPTION OF PREFERRED EMBODIMENT

Next, referring to FIGS. 3-5, preferred embodiments of the invention will be described in more detail.

Figure 1:
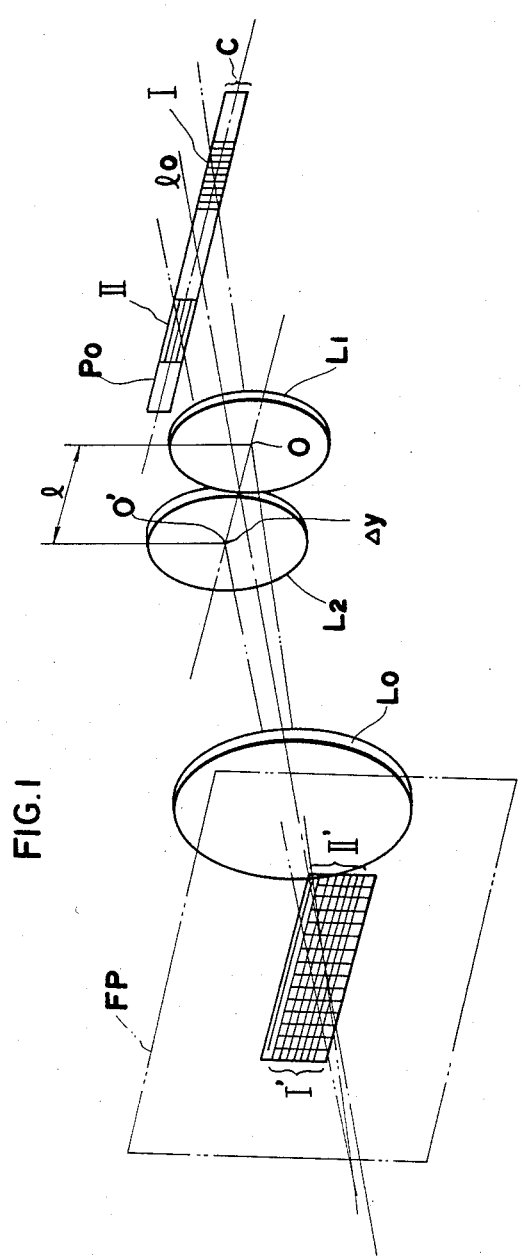
FIG. 1 is a schematic perspective view of a conventional focus detection apparatus of a camera.
Figure 2:
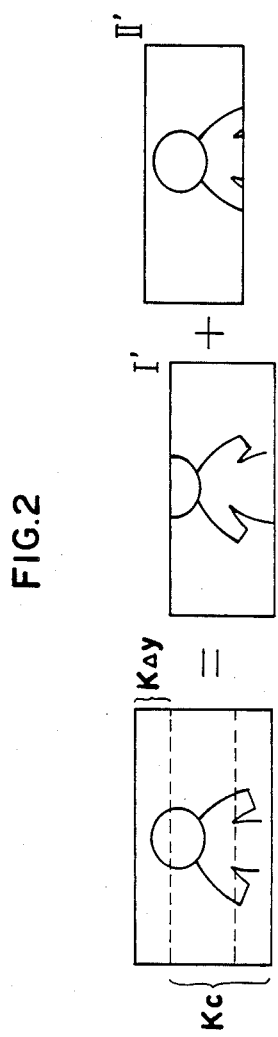
FIG. 2 is a schematic graph for the explanation of the operational the conventional apparatus shown in FIG. 1.
Figure 3:
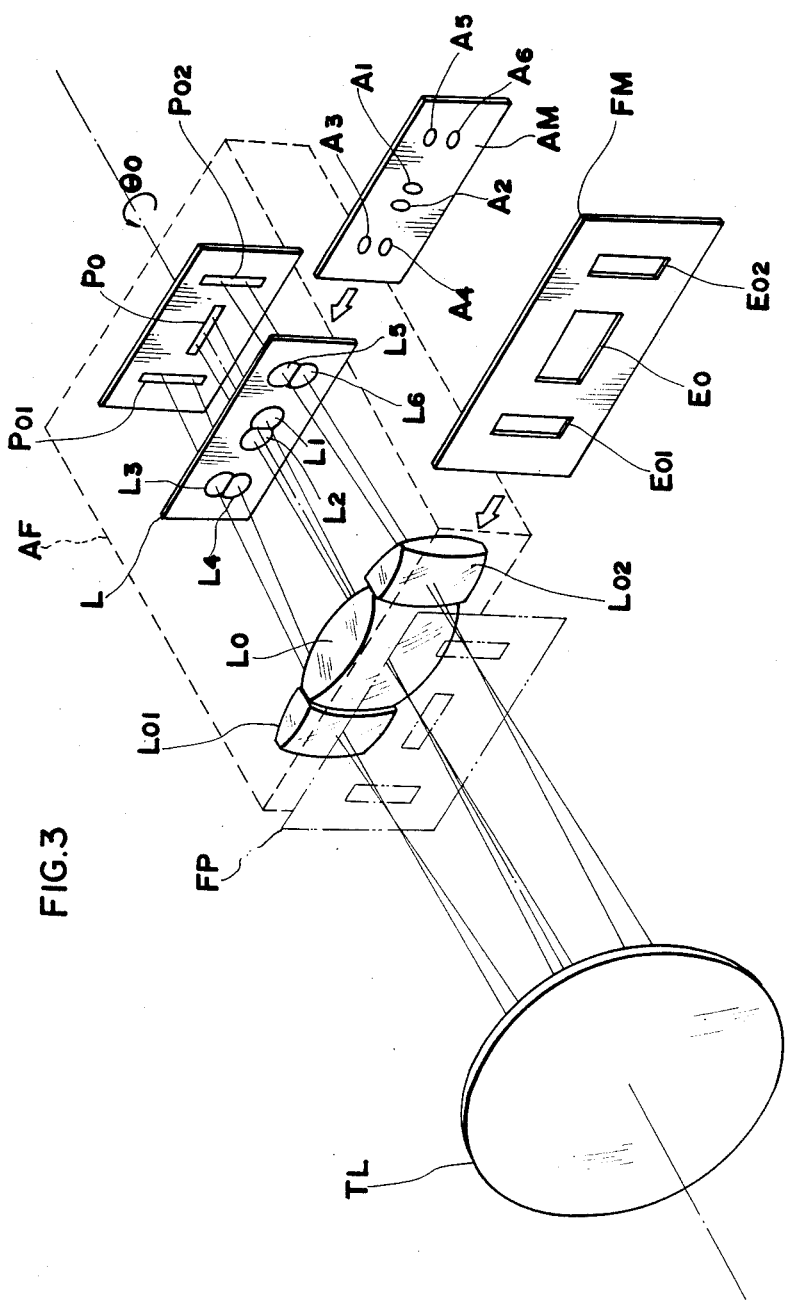
FIG. 3 is a schematic perspective view of a preferred embodiment of the inventive apparatus.

In FIG. 3, TL represents a photographing lens which is shown only representatively and schematically. FP represents a predetermined focal plane of the photographic lens TL, a field mask $F_M$ being arranged thereat as shown more in detail and separately in the same drawing. This mask $F_M$ is formed at the central area thereof with a horizontally elongated rectangular opening $E_0$ and at the both sides thereof, each at a small distance, with a pair of vertically elongated rectangular openings $E_{01}$ and $E_{02}$. Light bundles passed through these rectangular openings $E_0$; $E_{01}$ and $E_{02}$ are subjected to condensation by passing through respective condenser lenses $L_0$; $L_{01}$ and $L_{02}$, respectively. At a still downstream position, there is arranged a unitary re-imaging plate L of a transparent moldable material which is formed with a pair of re-imaging lens element pair $L_1$; $L_2$ arranged along the horizontal and axial line, not shown, of the plate L, and with two pairs of re-imaging lenses $L_3$; $L_4$ and $L_5$; $L_6$ at both sides of the central lens pair $L_1$; $L_2$, along respective lateral and vertical lines, not shown, at small distances from the central lens elements. All these re-imaging lenses $L_1$-$L_6$ are composed of plano-convex lenses of the same radius of curvature.

$A_M$ represents an aperture mask plate arranged for cooperation with the re-imaging plate L and shown separately in the same drawing for clearer representation, the mask $A_M$ being formed with elliptic openings $A_1$-$A_6$ that correspond to re-imaging lenses $L_1$-$L_6$. This aperture mask plate $A_M$ is positioned direct before the re-imaging plate L, and indeed, kept in tight contact with the flat surface area of the latter.

$P_0$ represents a line sensor which is mounted on the central portion of a substrate board, not shown, and formed into a laterally elongated plate having a pair of mutually separated line sensors $P_{01}$ and $P_{02}$ carrying first and second light reception elements. A central line sensor $P_0$ is provided at an intermediate position therebetween. A broken-lined block AF represents a AF-sensor module.

Figure 4A:
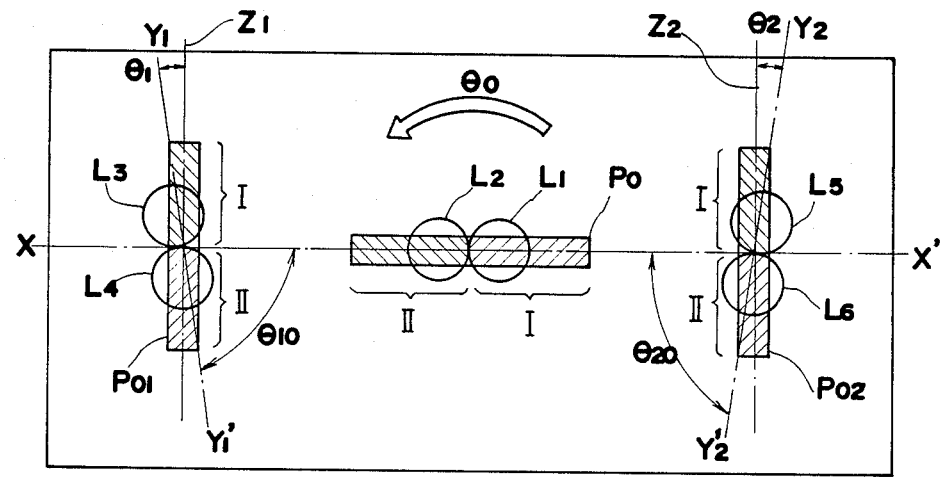
FIG. 4 (a) and (b), are explanatory graphs for the clarification of the working mode of the inventive apparatus shown in FIG. 3.

In FIG. 4(a), the re-imaging lenses $L_1$-$L_6$ and line sensors $P_0$, $P_{01}$ and $P_{02}$ are seen in the direction of the optical axis and in a mutually overlapped position, so as to show their practical cooperating relationship. $\theta_{10}$ and $\theta_{20}$ represent respective included angles between the center line X-X' passing through centers of lenses of the central re-imaging lens pair $L_1$; $L_2$ and those $Y_1$ and $Y_1'$ and $Y_2$ and $Y_2'$ passing respective sidewardly and oppositely arranged re-imaging lens pairs $L_3$; $L_4$ and $L_5$; $L_6$, respectively. These angles $\theta_{10}$ and $\theta_{20}$ must theoretically be each 90 degrees. In practice, however, respective error angles $\Delta\theta_1$ and $\Delta\theta_2$ are caused by unavoidable fabrication errors. These error angles $\Delta\theta_1$ and $\Delta\theta_2$ represent discrepancies between the center-to-center lines $Y_1$-$Y_1'$ and $Y_2$-$Y_2'$ of both side re-imaging lens pairs $L_3$; $L_4$ and $L_5$; $L_6$ and the axial lines $Z_1$; $Z_2$ of correspondingly side-arranged line sensors $P_{01}$; $P_{02}$.

Figure 4B:
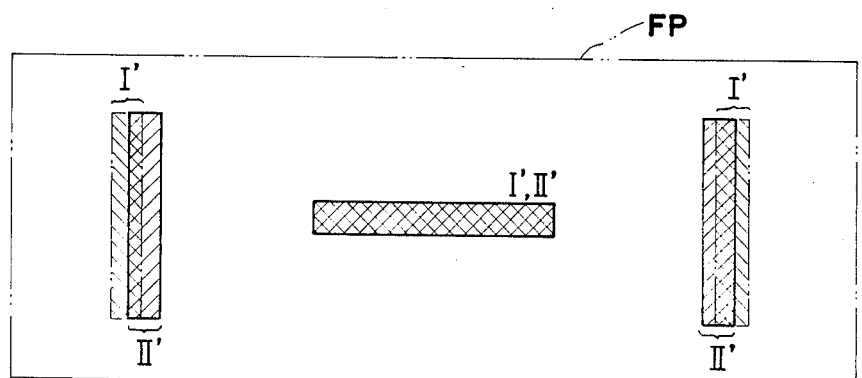

In FIG. 4(b), the squint cast phenomena results from the foregoing angular discrepancies and is projected reversingly on the predetermined focusing plane FP. In this case, it will be seen that at the central area of the angle $\theta_0$ between the line passing through the lens centers of reimaging lenses $L_1$; $L_2$ and the lateral extension line X-X' of line sensor $P_0$ has been effectively executed, so that there is no phase discrepancy found between the basic portion I' and the reference portion II' while, on the other hand, at the side area portions, the inclination angles $\Delta\theta_1$; $\Delta\theta_2$ are, indeed, not nil, thus representing squint casts which mean image shifts. When, in accordance with modern technology, a plurality series of light reception elements are provided on a single chip and a plurality of re-imaging lens pairs are provided on another single chip, the freedom of adjustability will become insufficient for such needs. In fact, indeed, only one of the plurality of distance measuring areas can be sufficiently adjusted, which means a grave defect. When, however, values of the foregoing inclination angles $\Delta\theta_1$; $\Delta\theta_2$ are minimized, such a result can be brought about that by adjusting only one of the distance measuring areas, the remaining areas thereof may also be automatically adjusted.

It should be noted that in the present embodiment, all the three pairs of re-imaging lenses $L_1$, $L_2$; $L_3$, $L_4$; and $L_5$, $L_6$ are made of plano-convex lens elements, having one and the same radius of curvature, and are molded into a one piece product. The electrical discharge machining electrodes used for the preparation of necessary metal molds can be fed to position with high preciseness, and indeed, without chucking-off there of, can result in a highly increased preciseness in mutual positioning of the re-imaging lenses $L_1$-$L_6$.

As for the line sensors $P_0$; $P_{01}$ and $P_{02}$, on the other hand, these can be positioned and arranged at a high preciseness on the substrate by utilization of the modern and precised manufacturing technique of semi-conductor integrated circuits, and thus, after all, by adjusting the angle $\theta_0$ in the region of the central distance measuring area, the angles $\Delta\theta_1$ and $\Delta\theta_2$ in the side areas can be automatically adjusted precisely, even if these angles may be generally assumed to be not nil.

In the present invention, each of the component lens pairs of the re-imaging lenses have been moldedly positioned and arranged together, the number of constituent parts has been reduced to a possible minimum and thus, the overall structure of the apparatus can be easily miniaturized at the least production cost.

In addition, since these re-imaging lenses are made of plano-convex lenses, having one and the same radius of curvature, the mutual positional relationship between the plurality of lens pairs is fixed at a high precision degree, and thus, when one of these lens pairs is positionally adjusted relative to one line of a light reception element series, the required adjustment of the other remaining pairs can be automatically attained, and thus, the overall lens adjustment time period can be shortened to an amazing degree inviting thereby a correspondingly higher productivity. Even if a preferred number of pairs of light reception elements are provided on a single chip, the necessary positional adjustment can be easily and simply realized. Also in this point, a highly miniatured and low cost focus detection apparatus can be provided. After the completion of the required adjustment, the so-called "squint-cast" phenomenon can be avoided effectively at any one of the focus detection areas, resulting in a well-realized detection of a focus adjustment state of the photographing lens system, as a predominant feature of the invention.

In the present embodiment, each of the re-imaging lens pairs is constructed and arranged in such a way that the convex portions of the lens pair are kept at their peripheries in contact with each other or separated only slightly from each other. With such structure and arrangement, an advantageous effect is realized that, during positioning period of the electric discharge machining electrodes in the case of machining of the metal molds preparation step, there is no fear of interference of already machined part(s) of the molds(s) with the electrode(s), so that a more precise positioning of the electrodes can be assumed.

Figure 5:
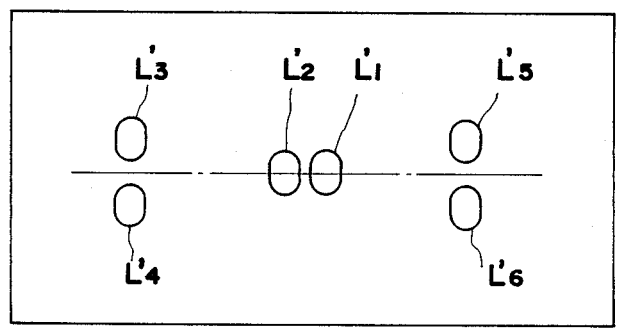
FIG. 5 is schematic graph for the illustration of preferable shapes and arrangement of electric discharge machining electrodes adapted for use in machining of modified refocusing lens elements.

In a modified arrangement shown in FIG. 5, the shape of the electric discharge electrode can be modified as shown at $L_1'$, $L_2'$, $L_3'$, $L_4'$, $L_5'$ and $L_6'$ or more specifically to represent a modified shape from the spherical one. Even with the use of such a modified electrode shape, a similar effect as in the case of the foregoing regular electrode configuration can be attained, if there is no mutual interference action during the positioning stage. Further, if the positional adjustment is insufficient for obtaining the desired effect, even if the electrode modification as set forth in the foregoing has been adopted, the central area or any selected one of the areas is adjusted to a certain high precision degree and the remaining areas are subjected to another modification as is shown and described in Japanese Open Patent Specification (unexamined) No. Sho-60 (1985)-31109.

What is claimed is:

1. A focus detection apparatus of a camera for detecting a focusing condition of a photographic lens of the camera, comprising:
   a plurality of focus detector assemblies, each comprising:
   a condenser lens for condensing light which forms an image by the photographic lens;
   a pair of re-imaging lenses for receiving a part of said image light from said condenser lens for dividingly reforming therefrom a first and a second partial image;
   first and second light reception element groups arranged separately and in line with each other and for receiving said first and second partial images, respectively, whereby mutual and positional differences between the first and second partial images are sensed as a function of the focusing condition of the photographic lens;
   all of the re-imaging lenses being formed of plano-convex lenses having one and the same radius of curvature.

2. The apparatus of claim 1, wherein each pair of said re-imaging lenses is arranged in periphery-to-periphery contacting relationship.

3. The apparatus of claim 1, wherein each pair of said re-imaging lenses is arranged at a small distance from each other when viewing in periphery-to-periphery relationship.

4. The apparatus of claim 1, wherein the receptive plano-convex lenses are formed as a unitary member.

5. The apparatus of claim 1, wherein three focus detector assemblies are provided and each of the plano-convex lenses are formed on the same unitary member.

6. The apparatus of claim 1 further including an aperture mask with elliptic openings corresponding to the respective lenses.

7. The apparatus of claim 5, wherein at least one pair of lenses is positioned so that a line through their respective centers would be at a position offset approximately 90° from a line through the respective centers of another pair of lenses.

8. In a focus detection apparatus for a camera, the improvement comprising:
   means for forming a plurality of images of different portion of an object to be focused, including at least two pairs of lenses formed on a single unitary member, each said pair of lenses forming a pair of images of an identical portion of the object respectively, and
   means for detecting the plurality of respective images and providing electrical signals corresponding to each respective pair of images.

9. The invention of claim 8, wherein the lenses are of a plano-convex configuration.

10. The invention of claim 8, wherein three pairs of lenses are formed on a single unitary member.

11. In an improved autofocus camera having a focus detecting apparatus, the improvement comprising:
   three detector means for detecting three pairs of images each detector means providing electrical signals corresponding to the respective pairs of images, and
   means for forming, on each respective detector means, a pair of images each member of each respective pair of images being an image of an identical portion of an object to be focused, each respective pair of images corresponding to a different portion of the object, said image forming means including a unitary optical member adjustable relative to the three detector means.

12. The invention of claim 11, wherein the unitary optical member includes three pairs of plano-convex lenses.

13. The invention of claim 11, wherein at least one pair of lenses is positioned so that a line through their respective centers would be at a position offset approximately 90° from a line through the respective centers of another pair of lenses.

14. The invention of claim 12, wherein the radius of curvature of each lens is the same dimension.

15. The invention of claim 12 further including an aperture mask with elliptic openings corresponding to the respective lenses.

16. The invention of claim 13 further including separate condenser lenses optically aligned with the respective pair of lenses.

17. In a focus detection apparatus for a camera, the improvement comprising:
   means for forming a plurality of images of first and second portions of an object to be focused, including first and second pairs of lenses formed on a single unitary member, said first pair of lenses forming a first pair of images of said first portion of said object, said second pair of lenses forming a second pair of images of said second portion of said object; and
   means for detecting said first and second pair of images and generating electrical signals corresponding to each said first and second pair of images, respectively.

* * * * *